United States Patent [19]

Scheffer et al.

[11] 4,245,869

[45] Jan. 20, 1981

[54] MAGNETIC BEARINGS

[75] Inventors: Dietrich Scheffer; Rolf Guse, both of Reutlingen, Fed. Rep. of Germany

[73] Assignee: Padana AG, Zug, Switzerland

[21] Appl. No.: 931,484

[22] Filed: Aug. 7, 1978

Related U.S. Application Data

[63] Continuation of Ser. No. 714,385, Aug. 16, 1976, abandoned.

[51] Int. Cl.³ .............................................. F16C 35/06
[52] U.S. Cl. ..................................................... 308/10
[58] Field of Search .......................................... 308/10

[56] References Cited

U.S. PATENT DOCUMENTS

| | | | |
|---|---|---|---|
| 3,238,788 | 3/1966 | Arthur | 308/10 |
| 3,650,581 | 3/1972 | Boden | 308/10 |
| 3,702,208 | 11/1972 | Habermann | 308/10 |
| 3,742,767 | 7/1973 | Bernard | 308/10 |
| 3,845,998 | 11/1974 | Gewecke | 308/10 |
| 3,877,761 | 4/1975 | Boden | 308/10 |
| 3,890,019 | 6/1975 | Boden | 308/10 |
| 4,080,012 | 3/1978 | Boden | 308/10 |
| 4,121,143 | 10/1978 | Habermann | 308/10 |

*Primary Examiner*—R. Skudy
*Attorney, Agent, or Firm*—Harness, Dickey & Pierce

[57] ABSTRACT

An electromagnetic bearing system for a movable (usually rotatable) member on a stationary member has bearing coils wound on a core for producing a magnetic field for supporting the movable member. High frequency sensor currents are applied to the bearing coils or to separate sensor coils on the same core or core portion as the bearing coils. The sensor currents produce signals responsive to deviation of the movable member from a desired position in which it is to be supported. These signals are amplified to provide bearing currents which are fed to the bearing coils.

17 Claims, 6 Drawing Figures

MAGNETIC BEARINGS

This is a continuation, of application Ser. No. 714,385, filed Aug. 16, 1976, now abandoned.

The invention relates to an electro-magnetic bearing system for supporting a movable member on a stationary member. U.S. Pat. No. 3,650,581 and British Pat. No. 1,257,423 describe a bearing system which has for each bearing plane at least one bearing element including at least one core and bearing coils wound onto the core, and has at least one regulating device for converting sensor currents into bearing currents which are fed to the bearing coils, the bearing currents being direct currents which are variable in conformity with the desired influencing of the movable member. In this instance, the bearing element for a radial bearing plane comprises electro-magnetic coils which comprise an iron core and bearing coils wound onto the iron core. The sensors or detectors may be inductive position sensors which accordingly have sensor coils. However, these sensors are mounted separately from the bearing elements. Separate sensors are a cost factor, particularly when it is borne in mind that at least three and usually four of them have to be provided for each bearing plane. The mounting of the sensors frequently involves structural difficulties and, like their electrical connection, it is expensive. Furthermore, from a purely structural point of view, it is virtually impossible to mount the sensors at the location at which the bearing forces are effective, so that the effective planes of the sensors and the bearings are always offset relative to one another in an axial or circumferential direction. However, this means that, although an inaccurately machined or easily flexible rotor can run true in the plane of the sensors, it wobbles in the bearing plane, thus leading to undesirable excitation of oscillations.

In the known inductive sensors, the cores of the bearing coils and of the sensor coils are carefully separated from one another since measurement would otherwise be impossible owing to interaction. This also applies to the system shown in Published German Patent Specification Offenlegungsschrift No. 2,129,018, in which sensor coils are provided which are arranged between the bearing coils but which have their own magnetic flux path.

Owing to the expense of the inductive sensors, both with respect to their size and with respect to the arrangement, the tendency is to use contactless position sensors of a different type. Thus, for example, published German Patent Specification (Offenlegungsschrift) No. 1,933,031 proposes the use of semi-conductor components whose electrical characteristics may be influenced by magnetic fields. Although components of this type, designated field plates for example, have only a small overall size, they are temperature and impact sensitive. Thus, special structural measures have to be taken in order to protect them against mechanical and thermal influences.

Therefore, an object of the invention is to provide an electro-magnetic bearing device which involves a minimum of structural expense for the manufacture and mounting of the position detectors or sensors which are as insensitive as possible to mechanical or thermal influences.

In accordance with the invention, an electro-magnetic bearing system for supporting a movable member on a stationary member comprises at least one bearing element which includes at least one core and bearing coils wound on to the core, means for passing high-frequency sensor currents through the bearing coil or coils associated with the or each core or portion of a core or through a sensor coil or coils wound on the same core or core portion as the bearing coil or coils, the sensor currents being modulable by the movements of the movable member relative to the stationary member in the region of the bearing element, and at least one regulating device for converting the sensor currents into bearing currents which are fed to the bearing coils, the bearing currents being direct currents which are variable in conformity with the desired influencing of the movable member.

Bearing systems of this type are primarily intended for supporting rotable or pivotable members in which the movable member is a rotor and the stationary member is a stator. Thus, the terms "rotor" and "stator" will be used in the description of the preferred embodiments, even though the invention is also suitable for mounting members of different construction or which move in a different way.

The bearing currents and the sensor currents can flow in the same or in separate coils which are associated with the same magnetic flux path. However, while the bearing currents have substantially a direct current characteristic and only their current amplitude or voltage magnitude is variable in conformity with the magnetic forces to be applied to the rotor, so that one can speak of a relatively low-frequency ripple bearing current, the sensor currents are high-frequency currents, that is they have a carrier frequency which is substantially in excess of the rotary speed or "frequency" of the rotor. The carrier current is modulated by the lateral or transverse movement of the rotor within the bearing element. The only movements which are converted into sensor currents are those which are of importance for the support, for example the radial movements in the case of a radial bearing, or the axial movements in the case of an axial bearing.

The further advantageous preferred features of the invention, which are further described hereinafter, render it possible to construct a large number of embodiments which offer a substantial technical advance in addition to the main advantages of a robust sensor system included in the actual bearing element. A very obvious and simple construction has an eight-pole stator in which either only the bearing coil (which then carries bearing and sensor currents) or separate bearing and sensor coils are wound onto each pole core. In this embodiment, although the magnetic field is not quite so homogeneous as when using rotary field stators or annular stators as described in British Pat. No. 1,424,071, the simple and robust construction involving a simple possibility of winding can have advantages when it is not a matter of obtaining extremely low bearing power losses. By way of example, if a rotor of a rotor spinning machine runs at a high rotational speed in air, the air friction losses are so great that a somewhat increased bearing resistance is scarcely of any consequence, since, in any case it only lies in the order of magnitude of percentages of the air friction if the magnetic bearing is constructed in accordance with the knowledge gained from U.S. Pat. No. 3,650,581 and British Pat. No. 1,257,423 and the subsequent literature.

Advantageously, however, it is also possible to use the present invention in the case of a bearing element having an annular core. In this case also, a particularly preferred embodiment is one in which separate sensor coils are not required, only a central tapping of the bearing coils being required. In this embodiment, the great advantage is clearly that an entire sub-assembly, that is, the assembly of four separate delicate and expensive sensors, is replaced by a single tapping of the bearing coils.

It is essential that the coils, which are associated with one degree of freedom in which the rotor is to be supported, for example the coils which are located opposite to one another and which support the rotor with respect to one transverse axis of the rotor in the case of a radial bearing, are connected such that the electro-magnetic influencing of the sensor currents by the bearing currents, and the electro-magnetic influencing of the bearing currents by the sensor currents, cancel one another. By way of example, these influences can occur in the form of induced voltages. This can be effected in individual branches of this circuit unit, or, alternatively, in the entire circuit.

The invention is further described by way of example, with reference to the accompanying diagrammatic drawings, in which.

Figure 1:
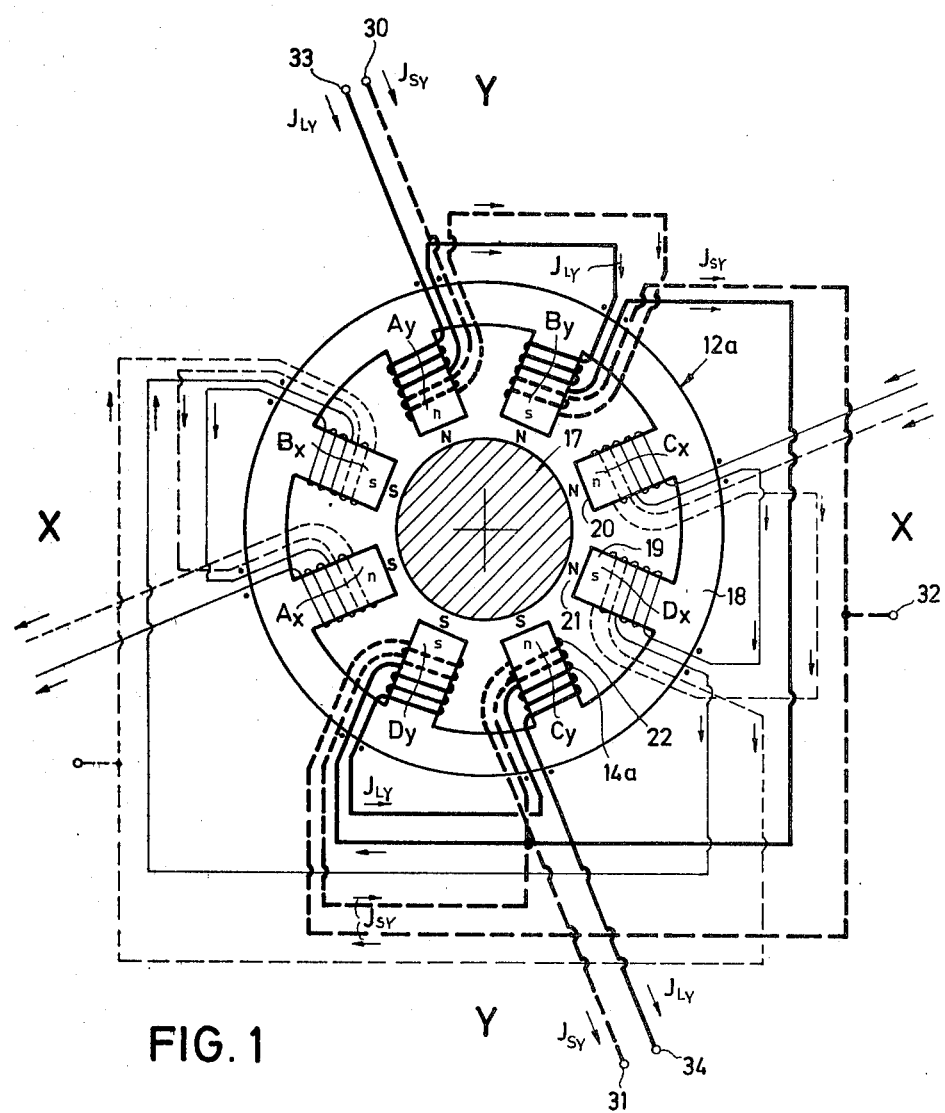
FIG. 1 is a diagrammatic radical sectional view of a bearing element in accordance with the invention, having eight poles and separate bearing and sensor coils, seen in the direction of the axis of the rotor.

In the drawings, the leads and windings associated with the axis denoted as the Y axis are shown by heavy lines while the leads and windings associated with the X axis are shown by thin lines for the purpose of clarifying the illustration. Furthermore, separate sensor coils and their supply leads are shown by broken lines, while bearing coils or combined bearing/sensor coils are illustrated by solid lines. Furthermore, all the air gaps are greatly exaggerated in conformity with the diagrammatic form of the illustration. Mutually corresponding ends of windings are characterised by a dot. The polarity originating from the bearing currents, that is the magnetic field of the bearing, is indicated by large letters N and S for North and South poles, while the polarity originating from the sensor currents, that is the sensor poles, is indicated by small letters n and s.

Figure 4:
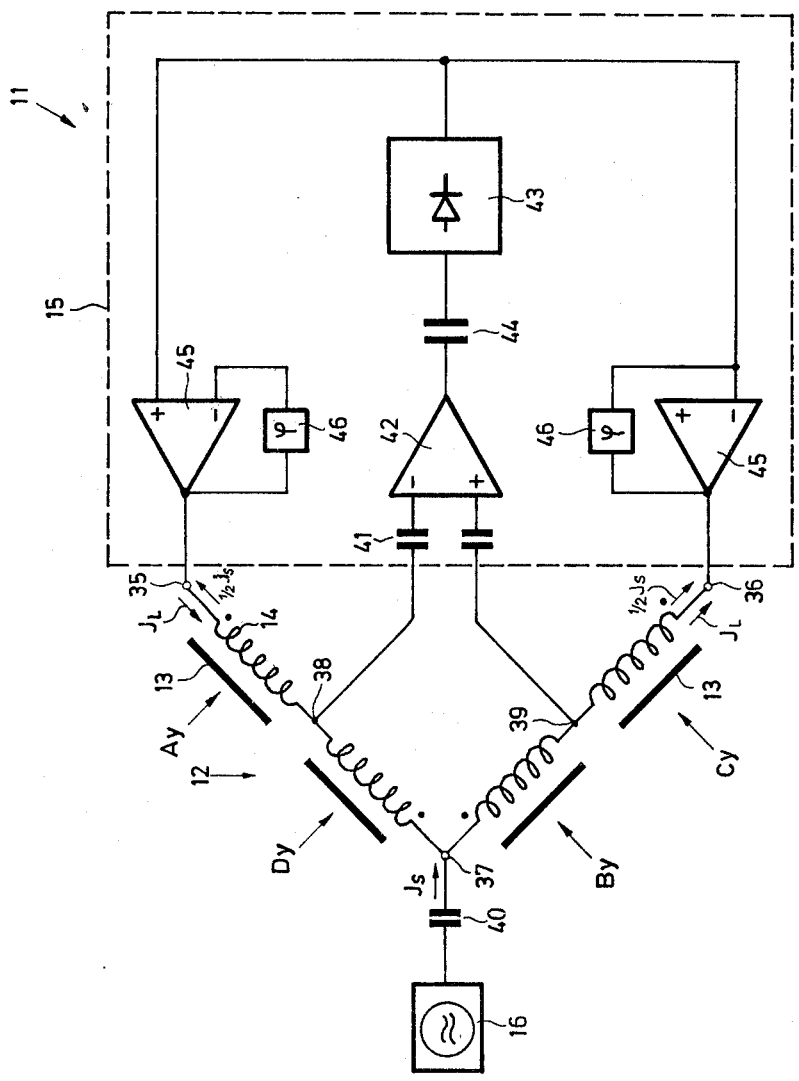
FIG. 4 is a block circuit diagram of the entire bearing device for a transverse axis of the rotor.

In the illustrated embodiments, the entire electro-magnetic bearing device for one bearing plane, one half of which is shown diagrammatically in FIG. 4, forms part of an electro-magnetic radial bearing. The principles of operation are rendered particularly clear in this radial bearing, although the device is also suitable for axial bearings or other bearings. The bearing device 11 comprises a bearing element 12 which is mounted on the stator and which has cores 13 which are made from ferromagnetic material and on which bearing coils 14 are mounted. A regulating device 15 converts sensor currents, which come from an oscillator or high-frequency generator 16 and are consequently of high-frequency, into bearing currents which have a substantially direct current characteristic and whose current or voltage magnitudes correspond to the desired influencing of the rotor for the purpose of journalling the latter. Two devices corresponding to FIG. 4, whose cores are staggered by 90° relative to one another so that they are effective in two respective degrees of freedom, are necessary for journalling at one radial plane. By way of example, two complete bearing elements can co-operate with a permanent-magnetic axial support magnet for the purpose of journalling a rotor in a contactless manner, as is explained in detail in U.S. Pat. No. 3,650,581 British Pat. No. 1,257,423.

A bearing element 12a is illustrated diagrammatically in FIG. 1 and is fixedly mounted on any optical type of stator. This bearing element serves for journalling a rotor 17 which forms the movable member to be supported. The bearing element is made from a ferromagnetic material, but not a permanent-magnetic material, such as a ferromagnetic compact. Alternatively it can be assembled from transformer laminations. The bearing element comprises an annular element or yoke 18 which interconnects the total of eight individual, radially inwardly projecting poles 19 and completes the magnetic flux path, an air gap 21 being formed between the free ends 20 of the poles 19 and the rotor. The poles carry electro-magnet windings, each pole carrying a bearing coil 14a and a sensor coil 22 in the embodiment shown in FIG. 1.

The poles 19 are wound and connected such that oppositely located pairs of adjacent poles A, B and C, D are formed. Two of these pairs of poles are provided for each axial direction x and y and are indicated in the drawing by the indices x and y respectively. The bearing coils are wound and connected such that the two poles of one pair of adjacent poles have the same polarity when the bearing currents blow, although the sensor coils 22 are wound and connected such that the two poles of one pair of poles have differing "sensor polarity" with respect to the sensor currents.

The stator can be of different construction. Thus, for example, it can have pole shoes rendering the magnetic field uniform and/or pole surfaces 20 adapted to the rotor. There is also no need to wind the sensor coils 22 separately; they can be formed by tapping a single coil. Here also, it is possible to wind the bearings and sensor coils on top of one another in different layers and to form them from wire or differing thicknesses.

Figure 2:
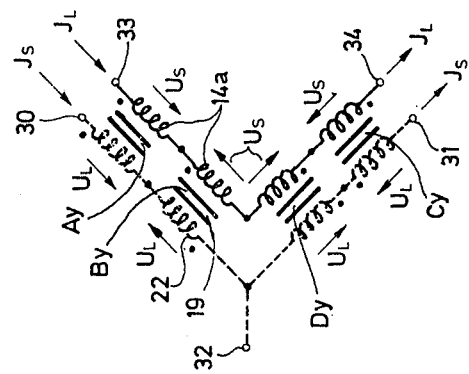
FIG. 2 is a circuit diagram of this embodiment, but only for the Y axis in FIG. 1.

FIG. 2 shows the circuit of a bearing device for a degree of freedom along the Y axis. As already described, the bearing coils 14a of the pairs of poles $A_y$, $B_y$ and $C_y$, $D_y$ are connected such that the current $J_L$ flows through all four bearing coils in series, and the poles of one pair of poles produce the same magnetization direction, although differing polarities exist in the air gap 21 in the case of the oppositely located pairs of poles (see FIG. 1).

The sensor current $J_S$ flows through the sensor coils 22 of the like poles $A_y$ to $C_y$ in series. However, as already mentioned, these poles are connected such that differing sensor polarities exist within each pair of poles. Poles located diametrically opposite one another thereby have the same polarity in the air gap 21. The bearing current $J_L$ flows from the terminal 33 to the terminal 34 through the bearing coils 14a, and the sensor current $J_S$ flows from terminal 30 to terminal 31. The point 32 is the sensor measuring point.

It will be seen from FIG. 2 that the bearing current $J_L$ produces opposite voltages $U_L$ of equal magnitude in the sensor coils 22 and, on the other hand, the sensor currents $L_S$ produce in the bearing coils 14a induced voltages $U_S$ which are also opposite and of equal magnitude. Thus the mutual induced voltages cancel one another within the pairs of poles $A_Y$, $B_y$ and $C_y$, $D_y$, so that, in the outcome, no mutual influencing occurs, although the coils 14a and 22 are wound onto the same cores 19 in each case. Thus, a sensor signal can be taken from the measuring point 32 and is only dependent upon the magnitude of the air gap 21 and not upon the currents $J_L$ flowing through the bearing coils 14a. On the other hand, the variations in the sensor currents also do not directly influence the bearing currents inductively, but only by way of the regulating device 15.

Thus, it will be seen that the two poles of a pair of poles act like a divided single pole with respect to their bearing action, while the sensor coils of a pair of poles act like two opposite single poles and form a closed magnetic flux path by way of the rotor and produce a signal dependent upon the size of the air gap.

Figure 3:
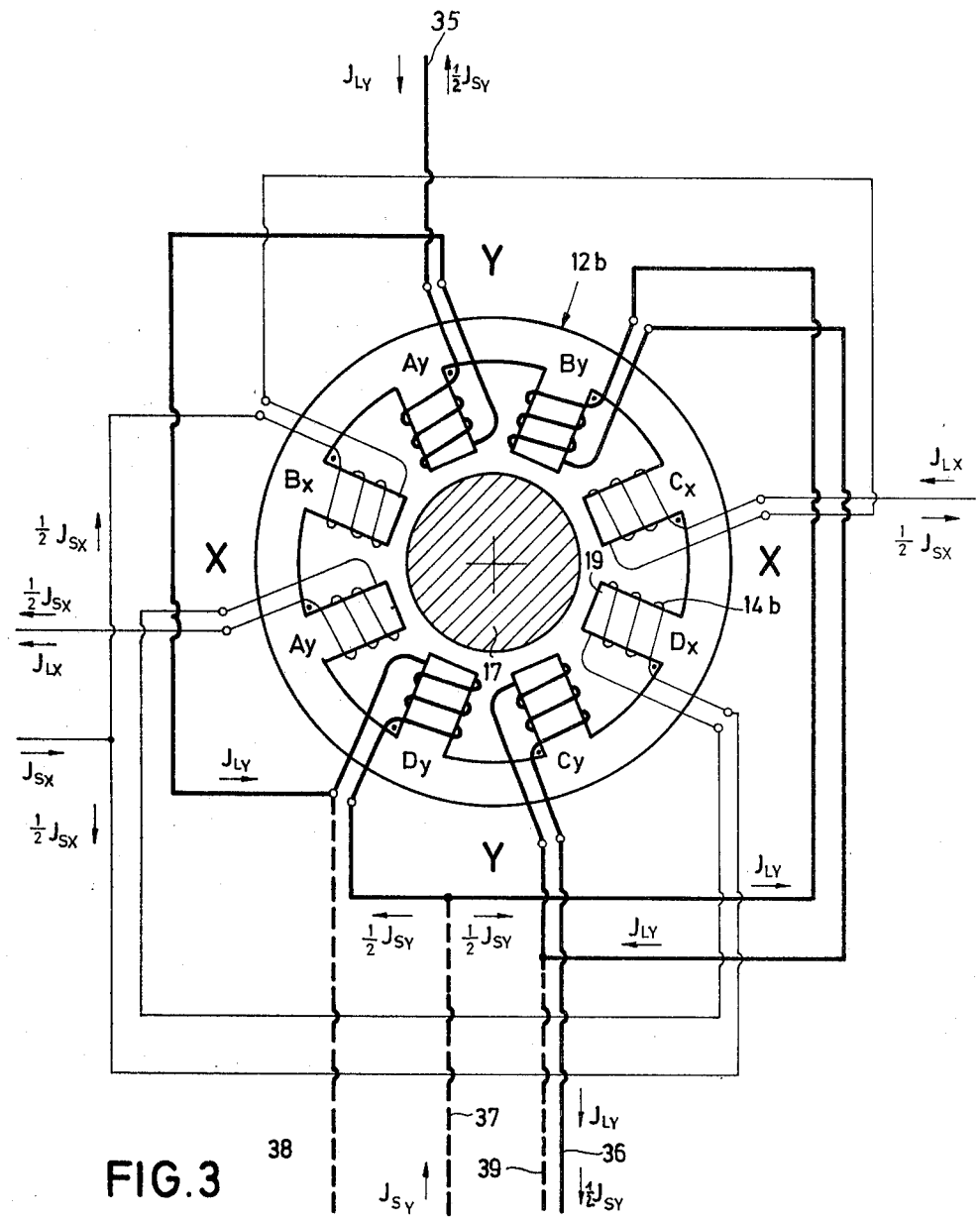
FIG. 3 is an illustration, corresponding to FIG. 1, of an eight-pole stator having combined bearing/sensor coils.

FIG. 3 shows an embodiment in which the bearing element 12b has the same eight-pole construction as is shown in FIG. 1. The rotor 17, which is made from a ferromagnetic material and not a permanent-magnetic material, is the same at that shown in FIG. 1. The difference is the manner in which the cores 19 of the poles are wound. Referring to FIG. 3, only a bearing coil 14b is provided on each core instead of a sensor coil and a bearing coil. The electrical circuit is shown in FIG. 4 wherein it will be seen that the coils 14b are connected in series between the terminals 35 and 36 with respect to the bearing current $J_L$, wherein, in contrast to the embodiment shown in FIG. 2, the pairs of poles are not connected directly adjacently to one another, so that two branches $A_y$, $D_y$ and $B_y$, $C_y$ are produced in which the coils are in each case connected with opposing directions of magnetization.

The connection point 37, to which the oscillator 16 is connected, is located between the two central coils $D_y$ and $B_Y$ of the series arrangement. Thus, the high-frequency sensor current $L_S$ flows through the two branches $A_y$, $D_y$ and $B_y$, $C_y$, to the terminals 35, 36. Sensor measuring points 38, 39 are located between the two coils of each branch and enable the sensor signal to be tapped in anti-phase. Alternatively, an in-phase signal can be produced by varying the series-connection of the bearing coils (for example the coils $B_y$ and $C_y$ are interchanged).

FIG. 4 shows that the magnet coils are connected with reverse polarity in each branch $A_y$, $D_y$ and $B_y$, $C_y$, since the two coils of each branch are associated with oppositely located pairs of poles of differing polarity. Since the oscillator 16 and the output amplifier 45 have very low internal resistances, the points 35, 36 for the carrier frequency constitute hypothetical zero points (with zero potential). On the other hand, the point 37 forms, for the bearing currents, a central or zero point at which the sensor currents are fed in, so that a sensor signal cannot be tapped from this point. However, this sensor signal exists in the centre of each branch at the points 38, 39. Although low-frequency (not in excess of the rotor frequency) potential changes (a low-frequency ripple) occur at these points, they are separated from the high-frequency sensor signals by filtering capacitors 41. Owing to the fact that the coils are connected in opposition, troublesome influencing of the magnetic fields of the bearings by the sensor currents does not occur.

The currents $J_L$ and $\frac{1}{2} J_S$ oppose one another in the upper branch between the points 35 and 37, while they flow in parallel in the lower branch between the points 37 and 36. The coils of a branch $A_y$, $D_y$ and $B_y$, $C_y$ should have equal inductive properties, thus preventing the occurrence of disadvantageous interference voltages.

The construction of the bearing element and the regulating device for the degree of freedom along the X direction (not shown in FIG. 4) is identical to that for the Y direction. The sensor poles which are adjacent to one another may be like poles or unlike poles. It has transpired that the arrangement of like poles is advantageous with specific embodiments.

The regulating device will be described in detail with reference to FIG. 4. The sensor signals which are tapped at the sensor measuring points 38, 39, and which are in anti-phase, are fed by way of the filters 41 to the push-pull inputs of an alternating voltage preamplifier. The filters 40, 41 are high-pass filters and are shown in the form of capacitors and substantially comprise capacitors.

The alternating voltage pre-amplifier 42 may be a particularly simple and inexpensive amplifier, since it does not have to take into account shifts in potential determined by temperature.

The filters 40, 41 which allow only high-frequency signals to pass, serve a double purpose. On the one hand, as already described, they prevent the bearing current $J_L$, existing as a direct current with a low-frequency ripple, from flowing off at the points 37, 38, 39 and, on the other hand, prevents a low-frequency cross coupling between the X direction and the Y direction. While the first-mentioned function, i.e. preventing the flowing-off of the bearing currents, is only required in the case of combined bearing and sensor coils, filters are also advantageous in the embodiment shown in FIG. 2, i.e. having separate bearing and sensor coils, since a low-frequency cross coupling can also occur in the embodiment shown in FIG. 2, the low-frequency of the cross direction also being added to the intended amplitude-modulated carrier frequency.

The signal amplified in the alternating voltage preamplifier 42 is fed by way of a capacitor 44, which permits the use of the advantageous alternating voltage peramplifier 42, to a demodulator 43, which acts like a rectifier and removes the low-frequency error signal wave from the high-frequency carrier wave. The low-frequency, amplified sensor signal is then fed to two low-frequency amplifiers 45 which operate in anti-phase and which are connected to the connection points 35, 36 of the bearing element 12. Phase members 46 are connected in feedback circuits of the low-frequency amplifiers 45 and ensure the necessary frequency characteristic and phase shift for adjustment of the rotor movements for the purpose of producing a damping effect.

It will be seen that the construction of the regulating device 15 is especially simple and, in particular, is no more complicated than when using separate semiconductor sensors or the like. The oscillator 16 for producing the sensor high-frequency can be common to all the magnetic bearings, particularly in large systems which comprise a large number of magnetic bearings, so that its cost is scarcely of any consequence. The regulating device for the embodiment shown in FIGS. 1 and 2 can be of the same construction as that shown in FIG. 4.

Figure 5:
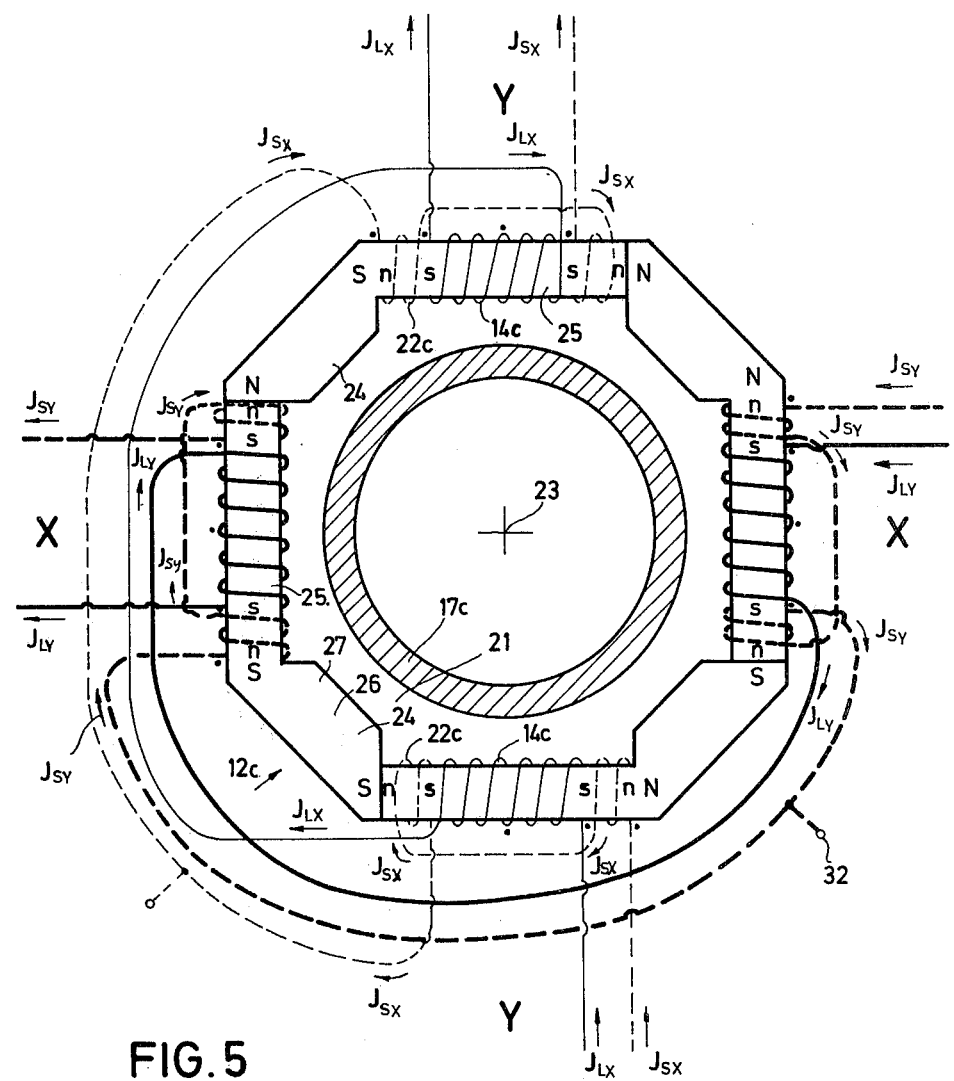
FIG. 5 shows a bearing element constructed in the form of an assembled annular core, having adjacent bearing and sensor coils, illustrated in a manner corresponding to FIG. 1.

The embodiments of the bearing elements shown in FIGS. 1 and 3 ensure the relatively satisfactory homogeneity of the magnetic field in the air gap, although they render it necessary to provide eight different coils and coil cores. This is less uneconomical than it appears, since it is substantially simpler to wind separate cores than, for example, to wind a ring. Nevertheless, it can be very advantageous to use a magnetic bearing having the advantageous annular configuration, as is described in British Pat. No. 1,424,071. A toroidal winding of this type is shown in FIG. 5. In principle, this bearing element 12c comprises a ferro magnetic annular core surrounding the rotor 17c which, in the present instance, is in the form of a ferro-magnetic annular core. The coils are then wound onto the annular core in toroidal fashion and their winding axis extends in a circumferential direction or in a tangential direction with respect to the axis 23 of rotation of the rotor.

Figure 6:
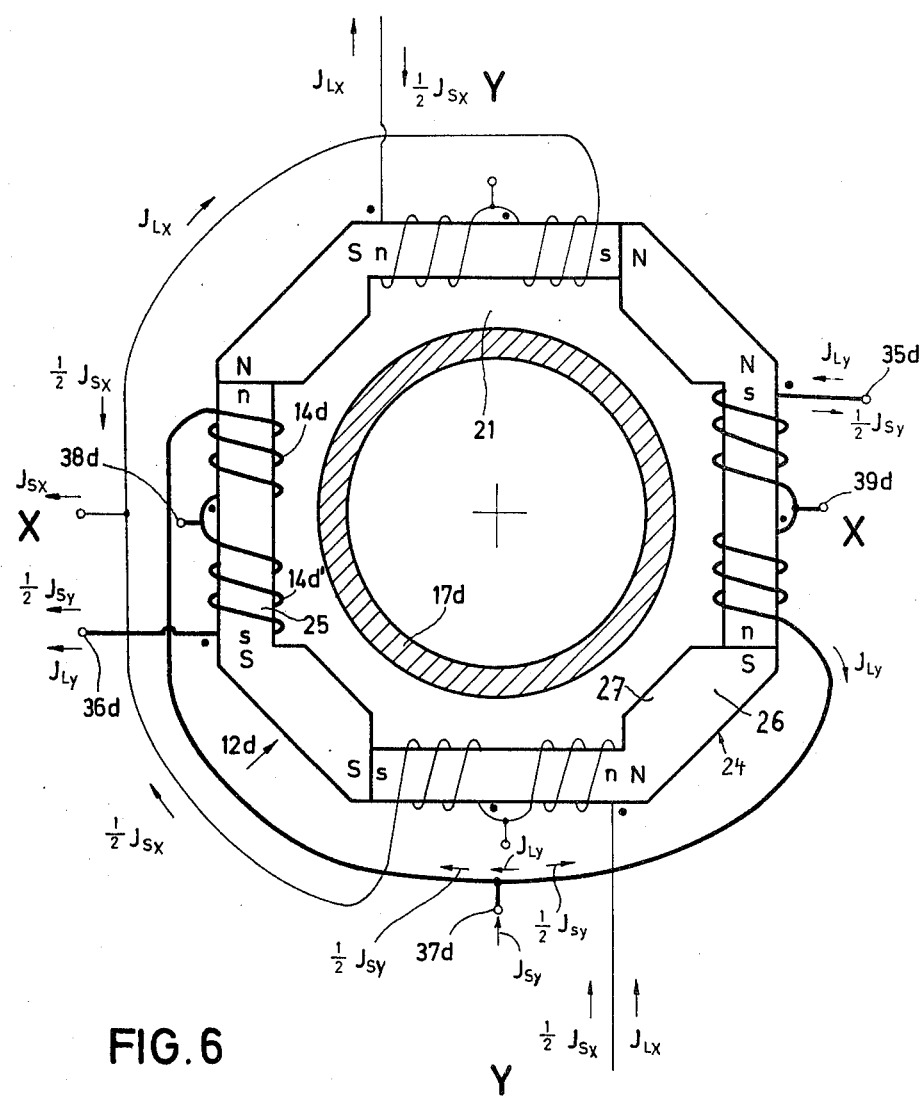
FIG. 6 is a similar view of a bearing element having an annular core as shown in FIG. 5, but having combined bearing/sensor coils.

However, in the embodiment illustrated in FIGS. 5 and 6, the annular core comprises four individual portions 24 which are manufactured individually and which are assembled after the coils have been wound onto them. These portions comprise a core portion 25 which carries the coils provided for a quarter of the periphery, and a pole portion 26 which bridges the connection to the next core portion and which has preferably an inwardly projecting pole-shoe-like construction such that the air gap 21 is kept small in this region. In the embodiments of FIGS. 5 and 6, the portions 24 have a rectilinear, tangentially extending core portion 25 which is adjoined by the inwardly directed pole-shoe-construction 27 of the pole portion 26 which extends at 45° to the core portion 25 and which bridges the corner of the square which would otherwise be formed. The core portion of the next portion is then juxtaposed to the end surface of the pole portion 26. This embodiment renders it possible to wind the portions individually in a simple manner by means of conventional transformer winding machines, thus substantially reducing the costs of manufacturing the toroidal winding. However, it is also conceivable to assemble the toroidal winding in different shapes from a plurality of parts.

The windings described hereinafter with reference to FIGS. 5 and 6 can be provided in all types of annular windings, even in those having a closed annulus.

The embodiment of the winding shown in FIG. 5 has, in the centre of each core portion 25, a bearing coil 14c, adjacent to each end of which is wound a sensor coil 22c. Care has to be taken that the coils are, in fact, also substantially spaced from one another. By way of example, it is possible for the sensor coils to overlap the bearing coils, although, for example, it is impossible to provide the two sensor coils 22c in the form of two superimposed winding layers which are not spatially separated from one another in the longitudinal direction of the core.

It will be seen from FIG. 5 that each core portion 25 assumes the function of a pair of poles A, B or C, D. In principle, the circuit is the same as that shown in FIG. 1. The coils associated with the Y direction are thereby arranged in the region of the X axis, since the magnetic effect occurs at the respective ends of the coils owing to the field displacement. The sensor coils 22c thereby measure the changes in inductance occurring between two coils on one core portion 25 during movement of the rotor. Thus, the sensors for the Y direction are located adjacent to the X axis. Alternatively, however, with appropriate wiring, they might be arranged on the core portions for the X direction, that is on the upper and lower core portions. This possibility also exists with the eight-pole embodiments already described and in the following embodiment of FIG. 6 which is still to be described. Because of the use of a toroidal winding, there is no need to separate the bearing coils into two separate coils.

It will be seen that, in this instance, a sensor pole is formed in the centre of each core portion 25. Lines of flux pass through the air gap 21 into the rotor 17c, so that, here also, an eight-pole division exists with respect to the action of the sensors. Thus, preferably eight locations acting as sensor poles are provided for a bearing element by means of which the rotor is to be subjected with respect to two axes Y, X. Since it would also be theoretically possible, although not particularly advantageous, to provide only three effective directions instead of a total of four effective directions (two for the X axis and two for the Y axis) in order to journal in a radial plane, at least six locations acting as sensor poles would have to be provided. It may also be mentioned that the advantageous mutual cancelling of induction voltages of the two types of current which, in particular, enables a sensor signal to be obtained which actually corresponds to the proximity or distance of the rotor to or from its desired position, can also be maintained when a rotor movement is effected in any optional direction and not in the exact direction of the X axis or Y axis. The sensor signals sensed at the corresponding measuring points are only those sensor signals which correspond to the displacement components in the particular X or Y directions.

The embodiment of simplest construction is that shown in FIG. 6 which is identical to that shown in FIG. 5 with respect to the construction of the annular core. However, this bearing element 12d has on each core portion 25 just two bearing coils 14d and 14d' which, as illustrated, can also be combined to form a single coil which is mounted on the core portion 25 and which is tapped in the centre to form a sensor measuring point 38d, 39d. However, care has to be taken that the tapping produces two coils which are separated spatially from one another in the longitudinal direction of the core portion 25, that is a tapping only in the electrical centre is inadequate when this does not produce two coils whose magnetic fields do not have different effective ranges in the direction of the axis of the coil. The circuit is similar to that shown in FIGS. 3 and 4. Here also, the changes in the inductance counteract one another such that the bearing currents are not impaired and sensor signals appear in anti-phase at the points 38d and 39d. The oscillator is connected at point 37d and the connection points 35d and 36d serve to feed the bearing currents. Here also, the same thing again applies to the X axis.

Referring to FIG. 6, the two portions 14d and 14d' of each bearing coil are connected with respect to their sensor action such that unlike poles meet in the centre of each core portion, and a salient magnetic pole is not produced. In this embodiment, the sensor action is produced chiefly by the stray magnetic field of the coils.

It will be seen that the invention provides a bearing device which permits satisfactory journalling with a simple construction which is mechanically and electrically reliable and insensitive. By virtue of the advantageous use of two different "types of current" for producing the magnetic bearing forces on the one hand, and the sensor action on the other hand, a very low-loss construction of the bearing element can be maintained. By way of example, the bearing coils are not loaded by ohmic resistors connected in series.

Preferably, the radial bearings described in the present context are pre-magnetized by means of permanent magnets or the like. By way of example, with a rotor speed of 1 kHz and a corresponding "frequency" of the bearing currents, the sensor carrier frequency can be of the order of magnitude of 20 kHz, i.e. considerably in excess of the rotor frequency.

We claim:

1. In an electro-magnetic bearing system for supporting a movable member relative to a stationary member; at least one bearing element which includes at least a one core, and electro-magnetic coil means wound on said one core, means for passing high frequency sensor currents through at least part of said coil means on said one core, said sensor currents being influenced by movements of said movable member relative to said stationary member in the region of said bearing element, and means including at least one regulating device for producing bearing currents through said electro-magnetic coil means on said one core responsive to said variations in said sensor currents and for applying said bearing currents to at least part of said coil means on said one core, said bearing currents being direct currents which are variable in response to said sensor currents to produce a magnetic flux extending through at least the portion of said core encircled by said coil means and into said movable member to support the latter and whereby said electro-magnetic coil means acts both as a sensor and as a means for producing bearing forces.

2. A bearing system according to claim 1, in which said coil means comprise single coils through which both said bearing currents and said sensor currents are adapted to flow.

3. A bearing system according to claim 1, in which said coil means comprise separate bearing and sensor coils each surrounding the core, said sensor currents being adapted to flow through said sensor coils and said bearing currents being adapted to flow through said bearing coils.

4. A bearing system according to claim 1, in which the core comprises at least six poles said coil means comprises at least six coils each serving a separate pole connected and arranged as separate coils.

5. A bearing system according to claim 1, in which the core comprises at least eight poles said coil means comprises eight coils each surrounding a respective pole and connected and arranged as separate coils.

6. A bearing system according to claim 4, in which said core defines at least six separate poles and said coils. means includes at least one bearing coil being wound around each said pole, said bearing currents being applied to said bearing coil.

7. A bearing system according to claim 1, including means connecting said coils to said regulating device cancels electro-magnetic influence of the sensor currents on the bearing currents in the particular branch associated with a degree of freedom in which the movable member is to be supported.

8. A bearing system according to claim 5, in which said core defines eight poles and said coil means includes coil means associated with each said pole, said bearing currents being applied to said coil means.

9. A bearing system according to claim 8, in which said poles form pairs of poles which are influenced by said bearing currents in said coil means to form like bearing poles and by said sensor currents in said coil means to form unlike sensor poles.

10. A bearing system according to claim 8, in which said bearing element has individual poles.

11. A bearing system according to claim 1, in which said core comprises an annular core and said coil means is wound toroidally on said annular core and is divided to define bearing coils, said bearing currents being applied to said bearing coils to produce different and/or opposingly directed magnetic fluxes.

12. A bearing system according to claim 11, in which each said bearing coil is divided to define two adjoining spatially separate regions and said sensor currents are applied to said bearing coils so that said separate regions thereof have different polarity with respect to the sensor currents.

13. A bearing system according to claim 11, in which said coil means further comprises sensor coils of which two are arranged on the annular core adjacent each said bearing coil.

14. A bearing system according to claim 11, in which said annular core comprises individual circumferential core portions.

15. A bearing system according to claim 14, in which said annular core includes substantially straight limbs on which said coil means is wound pole-shoe defining portions between said substantially straight lims.

16. A bearing system according to claim 1, further comprising electrical filter means associated with said coil means for separating the high-frequency sensor currents from the bearing currents of relatively low frequency ripple.

17. A bearing system according to claim 1, in which said regulating device includes alternating voltage preamplifier means for preamplifying said high-frequency sensor currents.

* * * * *